US012800534B2

(12) United States Patent
Nakao

(10) Patent No.: US 12,800,534 B2
(45) Date of Patent: Nov. 17, 2026

(54) SENSITIVE MEMBRANE, AND GAS SENSOR

(71) Applicant: PANASONIC HOUSING SOLUTIONS CO., LTD., Osaka (JP)

(72) Inventor: Atsuo Nakao, Nara (JP)

(73) Assignee: PANASONIC HOUSING SOLUTIONS CO., LTD., Osaka (JP)

( * ) Notice: Subject to any disclaimer, the term of this patent is extended or adjusted under 35 U.S.C. 154(b) by 225 days.

(21) Appl. No.: 18/848,765

(22) PCT Filed: Mar. 17, 2023

(86) PCT No.: PCT/JP2023/010581
§ 371 (c)(1),
(2) Date: Sep. 19, 2024

(87) PCT Pub. No.: WO2023/182206
PCT Pub. Date: Sep. 28, 2023

(65) Prior Publication Data

US 2025/0198959 A1 Jun. 19, 2025

(30) Foreign Application Priority Data

Mar. 23, 2022 (JP) ................................ 2022-047624

(51) Int. Cl.
*G01N 27/12* (2006.01)
*G01N 27/04* (2006.01)
*H01B 1/04* (2006.01)

(52) U.S. Cl.
CPC ........... *G01N 27/126* (2013.01); *G01N 27/04* (2013.01); *G01N 27/12* (2013.01); *G01N 27/128* (2013.01); *H01B 1/04* (2013.01)

(58) Field of Classification Search
CPC ...... G01N 27/126; G01N 27/04; G01N 27/12; G01N 27/128; H01B 1/04
See application file for complete search history.

(56) References Cited

U.S. PATENT DOCUMENTS

2017/0212069 A1* 7/2017 Nakao ...................... B01J 20/02
2020/0033283 A1* 1/2020 Nakao .................... G01N 27/12
2023/0349850 A1 11/2023 Shido et al.
2024/0151673 A1* 5/2024 Nakao .................... G01N 27/12
2024/0183813 A1* 6/2024 Nakao ................ G01N 33/0027
2024/0183814 A1* 6/2024 Shido ................... G01N 27/125
2024/0219335 A1* 7/2024 Nakao .................. G01N 27/125
(Continued)

FOREIGN PATENT DOCUMENTS

CN 110763737 A 2/2020
JP 2002-526769 A 8/2002
JP 2004-510953 A 4/2004
(Continued)

OTHER PUBLICATIONS

International Search Report dated May 23, 2023 issued in International Patent Application No. PCT/JP2023/010581, with English translation.

*Primary Examiner* — Ryan D Walsh
(74) *Attorney, Agent, or Firm* — Rimon P.C.

(57) ABSTRACT

A sensitive membrane contains a sensitive material and a plurality of conductive materials. Each of the plurality of conductive materials has a structure in which a plurality of conductive particles are coupled together in a direction substantially parallel to a thickness direction defined for the sensitive membrane.

9 Claims, 9 Drawing Sheets

(56) References Cited

U.S. PATENT DOCUMENTS

| | | | | |
|---|---|---|---|---|
| 2025/0216355 | A1* | 7/2025 | Nakao .................. | G01N 27/125 |
| 2026/0168949 | A1* | 6/2026 | Hanai .................. | G01N 27/126 |

FOREIGN PATENT DOCUMENTS

| | | | |
|---|---|---|---|
| JP | 2007-093884 | A | 4/2007 |
| JP | 2021-032842 | A | 3/2021 |
| WO | 00/20852 | A1 | 4/2000 |
| WO | 01/50117 | A1 | 7/2001 |
| WO | 2019/189245 | A1 | 10/2019 |
| WO | 2022/030574 | A1 | 2/2022 |

* cited by examiner

SENSITIVE MEMBRANE, AND GAS SENSOR

CROSS-REFERENCE OF RELATED APPLICATIONS

This application is the U.S. National Phase under 35 U.S.C. § 371 of International Patent Application No. PCT/JP2023/010581, filed on Mar. 17, 2023, which in turn claims the benefit of Japanese Patent Application No. 2022-047624, filed on Mar. 23, 2022, the entire disclosures of which Applications are incorporated by reference herein.

TECHNICAL FIELD

The present disclosure generally relates to a sensitive membrane and a gas sensor. More particularly, the present disclosure relates to a sensitive membrane including a membrane body containing a sensitive material and a carbon black contained in the membrane body and a gas sensor.

BACKGROUND ART

Patent Literature 1 discloses a sensor. The sensor includes a region containing a conductive organic material and a region containing a conductive material having a different composition from the conductive organic material. The sensor provides an electrical path through the region containing the conductive organic material and the region containing the conductive material. The conductive organic material is selected from the group consisting of polyanilines, emeraldine salts of polyanilines, polypyrroles, polythiophenes, poly EDOTs, and their derivatives.

CITATION LIST

Patent Literature

Patent Literature 1: JP 2002-526769 A

SUMMARY OF INVENTION

A sensitive membrane according to an aspect of the present disclosure contains a sensitive material and a plurality of conductive materials. Each of the plurality of conductive materials has a structure in which a plurality of conductive particles are coupled together in a direction substantially parallel to a thickness direction defined for the sensitive membrane.

A gas sensor according to another aspect of the present disclosure includes: a substrate; a pair of electrodes arranged on the substrate; and the sensitive membrane described above. The sensitive membrane is electrically connected to the pair of electrodes. Each of the plurality of conductive materials of the sensitive membrane has a structure in which the plurality of conductive particles are coupled together in a direction perpendicular to a direction in which the pair of electrodes are arranged side by side.

DESCRIPTION OF EMBODIMENTS

1. Overview

Figure 1A:
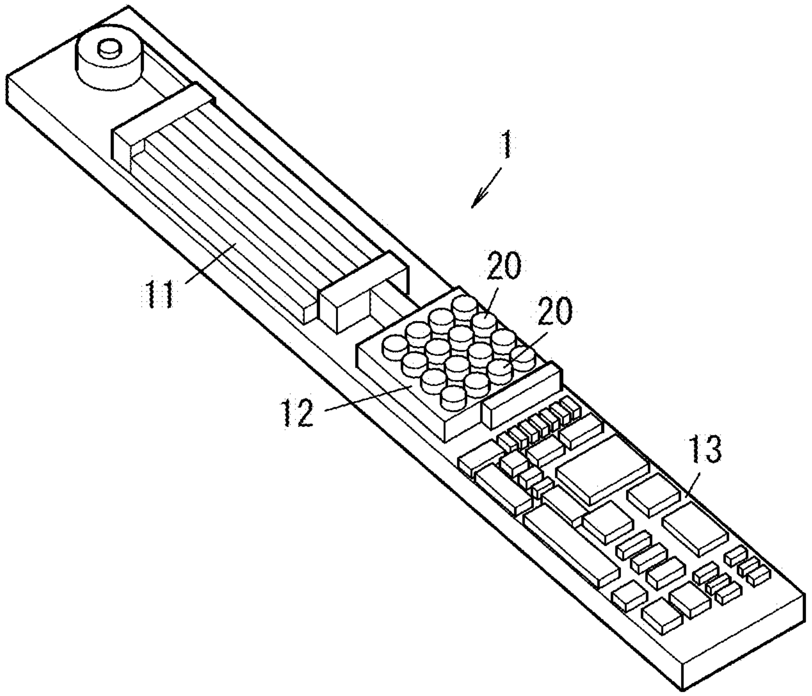
FIG. 1A is a perspective view illustrating a gas sensor according to an exemplary embodiment of the present disclosure.

The present inventors discovered, as a result of our unique research, that the sensor of Patent Literature 1 had so low a response speed that it sometimes took a few minutes to have measurement done. The present inventors carried out extensive research and development to conceive the concept of a sensitive membrane contributing to increasing the response speed and a gas sensor including such a sensitive membrane.

A sensitive membrane 20 according to this embodiment contains a sensitive material 201 and a plurality of conductive materials 202. Each of the plurality of conductive materials 202 has a structure in which a plurality of conductive particles 203 are coupled together in a direction substantially parallel to a thickness direction defined for the sensitive membrane 20. In this embodiment, each of the plurality of conductive materials 202 has such a structure in which the plurality of conductive particles 203 are coupled together in the direction substantially parallel to the thickness direction defined for the sensitive membrane. This reduces the chances of the conductive materials 202 obstructing, in the sensitive membrane 20, the movement of the analyte in the thickness direction defined for the sensitive membrane 20. This makes it easier for the analyte to be quickly adsorbed into the sensitive material 201 and quickly desorbed out of the sensitive material 201. This would accelerate the adsorption and desorption of the plurality of conductive particles 203 into/out of the sensitive material 201 compared to a situation where the plurality of conductive particles 203 are dispersed at random, thus enabling increasing the response speed of the sensitive membrane 20. Consequently, applying the sensitive membrane 20 to the gas sensor 1 allows the gas sensor 1 to have an increased response speed.

2. Details

Specific configurations for a gas sensor and sensitive membrane according to the present disclosure will now be described in detail.

First, a configuration for a gas sensor will be described with reference to the accompanying drawings (namely, FIGS. 1A-2B).

[Gas Sensor]

A gas sensor 1 according to this embodiment includes a substrate 120, a pair of electrodes 21, and a sensitive membrane 20. The pair of electrodes 21 are arranged on the substrate 120. The sensitive membrane 20 is electrically connected to the pair of electrodes 21. Each of the plurality of conductive materials 202 of the sensitive membrane 20 has a structure in which a plurality of conductive particles 203 are coupled together in a direction perpendicular to a direction in which the pair of electrodes 21 are arranged side by side. The sensitive membrane 20 contains a sensitive material 201 and a plurality of conductive materials 202. A preferred embodiment of the sensitive membrane 20 will be described later.

FIG. 1A illustrates a schematic configuration for a gas sensor 1 according to this embodiment. The gas sensor 1 may be used to detect, as a detection target, molecules included in a gas. Examples of the detection target include molecules of: combustible gases such as methane, propane, and butane; poisonous gases such as ammonia, hydrogen sulfide, and carbon monoxide; and volatile organic compounds (VOCs). However, these are only exemplary detection target molecules and should not be construed as limiting. The detection target may include a substance that stimulates the human olfactory sense (i.e., so-called "odor components"). The gas sensor 1 may detects VOCs included in a sample gas such as a gas taken from a food, a breath taken from a human body, or the air taken from a building room.

As shown in FIG. 1A, the gas sensor 1 includes a supply unit 11, a sensor unit 12, and a processing unit 13. The supply unit 11 supplies a sample gas and a reference gas to the sensor unit 12. The "sample gas" as used herein refers to a gas including either a single molecule or a plurality of molecules as detection target, e.g., a gas including the odor components described above. The "reference gas" as used herein may refer to an inert gas such as nitrogen gas, oxygen gas, and helium gas. The reference gas may also be an odorless gas.

In FIG. 1A, the sensor unit 12 includes a plurality of sensitive membranes 20 and a plurality of electrodes 21. The processing unit 13 includes a detection unit (not shown) for detecting a variation in the resistance value measured by the sensor unit 12, for example, and a control unit (not shown) for controlling the operation of the gas sensor 1. The supply unit 11 includes piping through which the sample gas and the reference gas circulate, for example. The processing unit 13 includes electric circuits serving as the detection unit and the control unit. Note that the gas sensor 1 has only to include the sensor unit 12, and the supply unit 11 and the processing unit 13 are not essential constituent elements for the gas sensor 1.

Figure 1B:
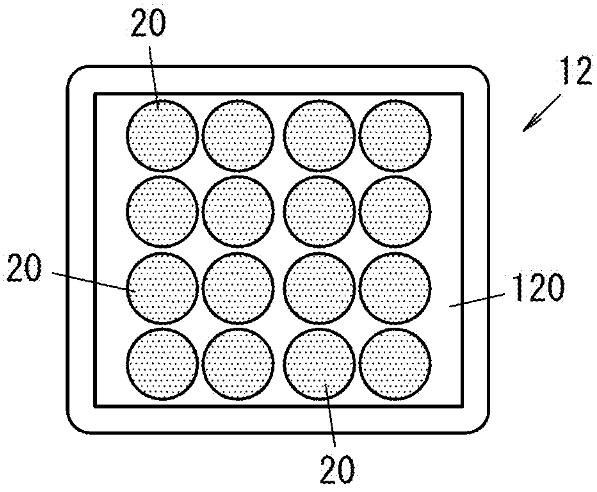
FIG. 1B is a plan view illustrating a sensor unit of the gas sensor.

As shown in FIG. 1B, the sensor unit 12 is formed by providing a plurality of sensitive membranes 20 on a substrate 120. A number of sensitive membranes 20 are arranged vertically and horizontally to form an array (e.g., a 4×4 array in FIGS. 1A and 1B) of sensitive membranes 20 on the substrate 120. Each of these sensitive membranes 20 is formed in a circular pattern in plan view. Note that the number, arrangement, and shape of the sensitive membranes 20 in the sensor unit 12 do not have to be the ones shown in FIG. 1B but may also be changed as appropriate according to the type of the gas sensor 1, for example.

Figure 1C:
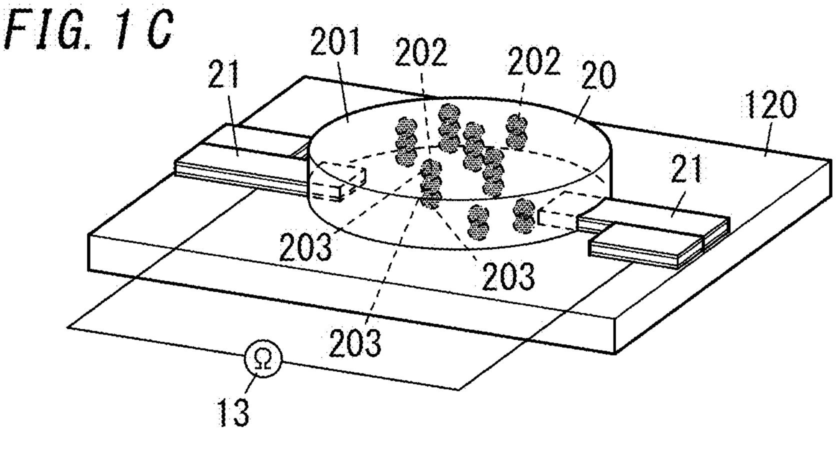
FIG. 1C is a perspective view illustrating a sensitive membrane according to the exemplary embodiment of the present disclosure.

As shown in FIG. 1C, each sensitive membrane 20 includes a sensitive material 201 that adsorbs the detection target and a plurality of conductive materials 202. Each of the conductive materials 202 includes a plurality of conductive particles 203.

Next, it will be described with reference to FIGS. 2A and 2B how this gas sensor 1 operates. Although the sensitive membrane 20 is shown in FIGS. 2A and 2B in an exaggerated form to illustrate how the sensitive membrane 20 expands and shrinks, FIGS. 2A and 2B should not be construed as limiting the configuration, number, shape, dimensions, state, and other parameters of the gas sensor 1 and sensitive membrane 20 according to the present disclosure.

A pair of electrodes 21 are connected to the sensitive membrane 20. Each of these electrodes 21 is electrically connected to the conductive particles 203 in the conductive materials 202 in the sensitive membrane 20. If the gas sensor 1 includes the processing unit 13, the pair of electrodes 21 are preferably electrically connected to the detection unit of the processing unit 13.

Figure 2A:
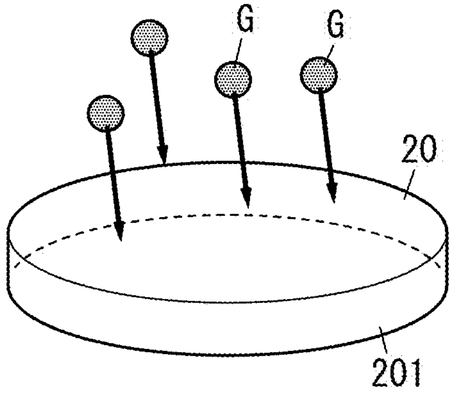
FIGS. 2A and 2B illustrate how the sensitive membrane of the gas sensor operates.
Figure 2B:
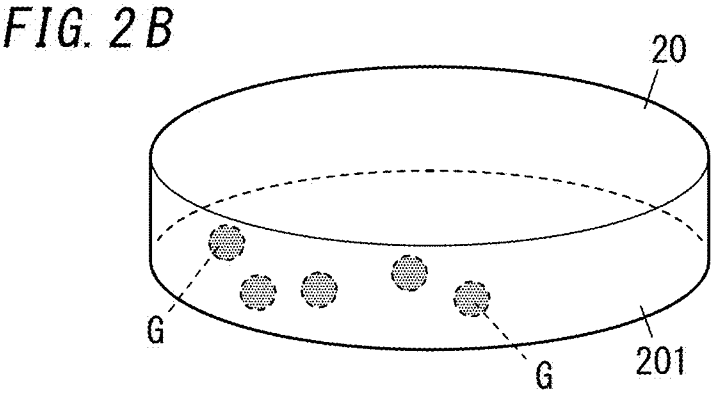

Once the sensitive membrane 20 having such a configuration has adsorbed the molecules G as the detection target as shown in FIG. 2A, for example, the sensitive material 201 expands to widen the gap between the conductive particles 203 as shown in FIG. 2B.

Figure 3:
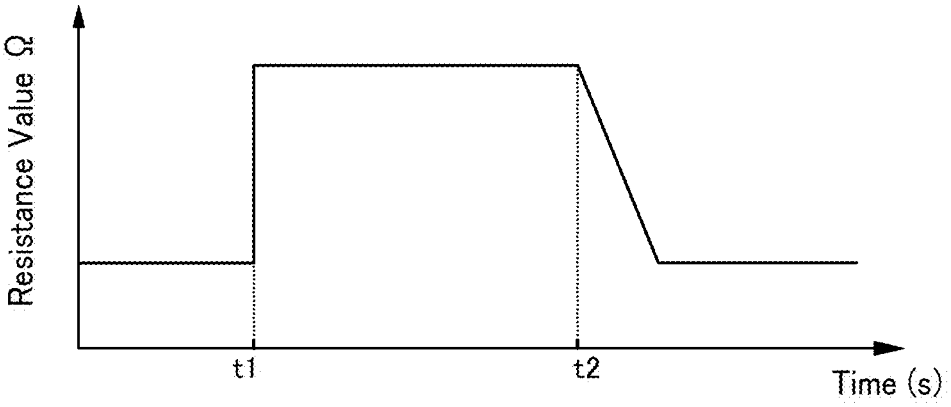
FIG. 3 is a graph showing how the resistance value may change with time through the operation of the sensitive membrane of the gas sensor.

As a result, as the sensitive membrane 20 adsorbs the molecules G, the sensitive material 201 expands to have an increased thickness and comes to have an increased electrical resistance value (hereinafter simply referred to as a "resistance value") at a time t1 of adsorption as shown in FIG. 3. Meanwhile, as the molecules G desorb from the sensitive membrane 20, the sensitive material 201 begins to shrink and gradually recovers its original shape. As a result, the resistance value starts to decrease gradually at a time t2 of desorption of the molecules G. Consequently, the gas sensor 1 may determine, by making the detection unit of the processing unit 13, which is electrically connected to the electrodes 21, detect this variation in the resistance value, whether there are any molecules G in the sample gas supplied from the supply unit 11 to the sensor unit 12.

In particular, in this embodiment, the sensitive membrane 20 has such a structure in which the plurality of conductive materials 202 are coupled together in a direction substantially parallel to the thickness direction defined for the sensitive membrane 20 as described above. Thus, the gas sensor 1 may detect the analyte at a high response speed during the above-described measurement. Note that the response speed according to the present disclosure may be measured and evaluated by the method that will be described later for Examples. Also, in the gas sensor 1 according to this embodiment, each of the plurality of conductive materials 202 included in the sensitive membrane 20 has a structure in which the plurality of conductive particles 203 are coupled together in a direction perpendicular to the direction in which the pair of electrodes 21 are arranged side by side. This enables providing a gas sensor with a particularly excellent response speed. Such a configuration may be provided by forming the sensitive membrane 20 while adjusting, as appropriate, the sensitive membrane 20 and the types, proportions, and other parameters of the components which may be included in the sensitive membrane 20 to be described in detail later.

Next, a preferred configuration for the sensitive membrane 20 according to this embodiment will be described.

[Sensitive Membrane]

The sensitive membrane 20 includes the sensitive material 201 that adsorbs an analyte and the plurality of conductive materials 202. Each of the plurality of conductive materials 202 in the sensitive membrane 20 has a structure in which the plurality of conductive particles 203 are coupled together in a direction substantially parallel to the thickness direction defined for the sensitive membrane.

(Sensitive Material)

The sensitive material 201 is a component which may adsorb the analyte. In this embodiment, the sensitive material 201 is a material which may expand when adsorbing the analyte. Thus, the sensitive material 201 may impart good sensor capability to the sensitive membrane 20. Specifically, the sensitive material 201 makes a variation in resistance value more easily detectible based on the expansion of the sensitive material 201 that has adsorbed the analyte. Therefore, applying the sensitive material 201 to the sensitive membrane 20 electrically connected to the electrodes 21 makes it easier to detect the analyte based on the variation in resistance value.

The sensitive material 201 may be selected according to, for example, the type of the chemical substance to adsorb and the type of the conductive particles 203. The sensitive material 201 is made of an organic material with electrical insulation properties and may include, for example, at least one material selected from the group consisting of high molecular (macromolecular) materials and low molecular materials. Among other things, the sensitive material 201 preferably includes a high molecular material. Adding a high molecular material to the sensitive material 201 may impart heat resistance to the sensitive membrane 20.

It is more preferable that the sensitive material 201 contain a compound having either or both of a polysiloxane structure and/or a polyethylene glycol structure. This may improve the adsorption/desorption capability of the sensitive membrane 20 particularly significantly. As used herein, the "polysiloxane structure" refers to a structure having an —Si—O—Si— structural unit in a molecule. The "polyethylene glycol structure" as used herein refers to a structure having an —O—$CH_2CH_2$— structural unit in a molecule. Examples of compounds having the polysiloxane structure include polysiloxanes to be described later. Examples of compounds having the polyethylene glycol structure include compounds included in the polyethylene glycols to be described later. The sensitive material 201 may naturally have both the polysiloxane structure and the polyethylene glycol structure. Examples of such compounds having both the polysiloxane structure and the polyethylene glycol structure include polysiloxane-polyethylene glycol copolymers.

Examples of the sensitive material 201 include materials commercially available as stationary phases for columns in gas chromatographs. More specifically, the sensitive material 201 preferably includes, for example, at least one material selected from the group consisting of polysiloxanes, polyalkylene glycols, polyesters, silicones, glycerols, nitriles, dicarboxylic acid monoesters, and aliphatic amines. This allows the sensitive material 201 to easily adsorb chemical substances (volatile organic compounds, in particular) in a gas such as the sample gas.

The polysiloxanes may include at least one material selected from the group consisting of, for example, dimethyl silicone, phenylmethyl silicone, trifluoropropyl methyl silicone, and cyano silicone (with a heat resistant temperature of 275° C.).

The polyalkylene glycols include, for example, polyethylene glycol (with a heat resistant temperature of 170° C.). The polyesters include, for example, at least one material selected from the group consisting of poly(diethylene glycol adipate) and poly(ethylene succinate).

The glycerols include, for example, diglycerol (with a heat resistant temperature of 150° C.). The nitriles include at least one material selected from the group consisting of, for example, N, N-bis(2-cyanoethyl) formamide (with a heat resistant temperature of 125° C.) and 1, 2, 3-tris(2-cyanoethoxy) propane (with a heat resistant temperature of 150° C.).

The dicarboxylic acid monoesters include at least one material selected from the group consisting of, for example, nitro terephthalic acid-modified polyethylene glycol (with a heat resistant temperature of 275° C.) and diethylene glycol succinate (with a heat resistant temperature of 225° C.).

The aliphatic amines include, for example, tetra hydroxyethyl ethylenediamine (with a heat resistant temperature of 125° C.).

(Conductive Material)

The conductive material 202 is a material with electrical conductivity. The conductive materials 202 may be dispersed in the sensitive membrane 20. As described above, when the sensitive material 201 adsorbs the analyte as the detection target, the sensitive membrane 20 may expand, thus causing an increase in the gap between the plurality of conductive materials 202 and thereby causing an increase in the resistance value of the sensitive membrane 20 as well. That is why if the sensitive membrane 20 is applied to the gas sensor 1, a variation in the resistance value may be detected using the pair of electrodes 21 which are in contact with the sensitive membrane 20 in the gas sensor 1.

Figure 4A:
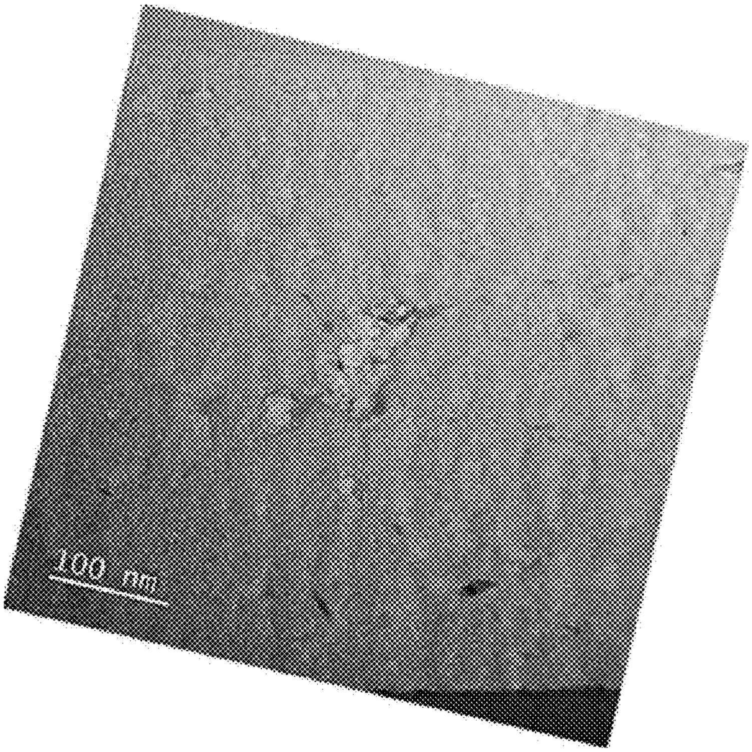
FIG. 4A is a scanning micrograph (TEM image) showing a cross section of a part of a sensitive membrane according to Example 1.
Figure 4B:
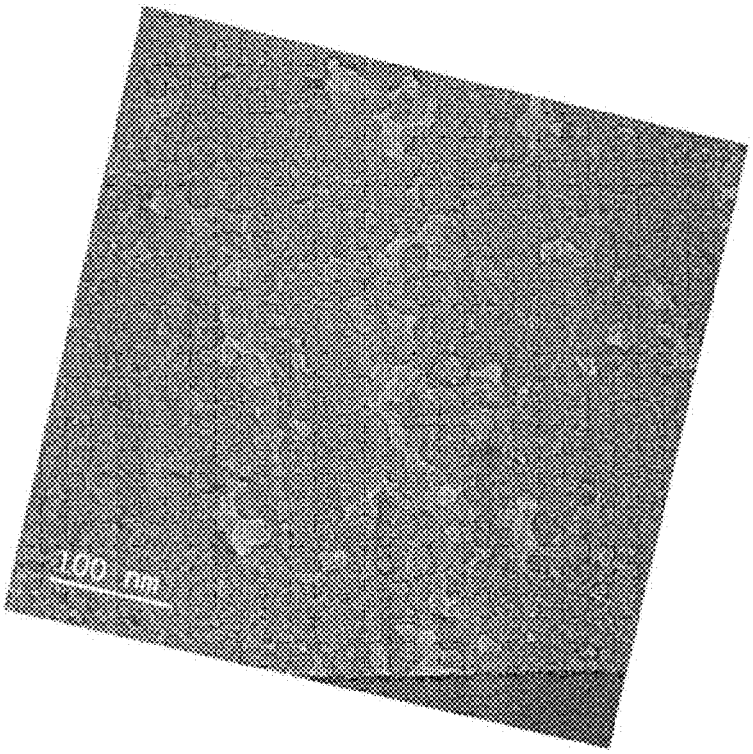
FIG. 4B is a scanning micrograph showing a cross section of a part of a sensitive membrane according to Comparative Example 1.
Figure 5A:
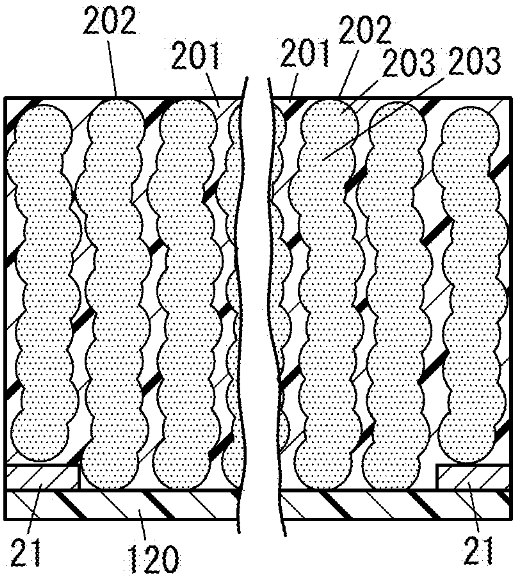
FIG. 5A is a schematic cross-sectional view generally illustrating a condition of a conductive material included in a sensitive membrane according to Example 1.

The conductive material 202 includes conductive particles 203. As described above, the conductive materials 202 according to this embodiment have a structure in which a plurality of conductive particles 203 are coupled together in a direction substantially parallel to the thickness direction defined for the sensitive membrane 20. Thus, the plurality of conductive materials 202 are arranged one on top of another in an arbitrary cross section parallel to the thickness direction defined for the sensitive membrane 20 while having such a structure formed by the plurality of conductive particles 203. Specifically, in this embodiment, the plurality of conductive materials 202 are dispersed in the sensitive membrane 20. In addition, the conductive materials 202 which are adjacent to each other in the sensitive membrane 20 are spaced from each other in a direction perpendicular to the thickness direction defined for the sensitive membrane 20. This makes it easier for the detection target (i.e., the analyte) such as a fluid to permeate the sensitive membrane 20, thus allowing the analyte to be adsorbed into the sensitive material 201 more easily. Thus, the sensitive membrane 20 according to this embodiment may have an increased response speed. FIGS. 4A and 4B are transmission electron microscope (TEM) images showing a part of the sensitive membrane 20 which were shot through a TEM in Example 1 and Comparative Example 1. FIG. 5A is a schematic cross-sectional view generally illustrating, based on the TEM image shown in FIG. 4A, the structure and arrangement of the conductive materials 202. The TEM images will be described in detail later in Examples to be posted later.

The plurality of conductive materials 202 are preferably dispersed in the sensitive membrane 20 to be spaced from each other in a direction perpendicular to the thickness direction defined for the sensitive membrane 20. In addition, the sensitive material 201 is preferably interposed between adjacent ones of the plurality of conductive materials 202. Interposing the sensitive material 201 between the plurality of conductive materials 202 in the sensitive membrane 20 causes the resistance value to vary more readily in the direction perpendicular to the thickness direction defined for the sensitive membrane 20 as the sensitive material 201 expands and shrinks. That is why arranging, in the gas sensor 1, the pair of electrodes 21 such that the electrodes 21 are spaced from each other in the direction perpendicular to the thickness direction defined for the sensitive membrane 20 contributes to improving the sensitivity of the sensitive membrane 20 particularly significantly.

The mean particle size of the conductive particles 203 is preferably equal to or greater than 10 nm and equal to or less than 100 nm. Setting the mean particle size at a value equal to or greater than 10 nm makes it easier to avoid causing an increase in the resistance value in the direction perpendicular to the thickness direction defined for the sensitive membrane 20. Setting the mean particle size at a value equal to or less than 100 nm makes it easier for the sensitive membrane 20 to have such a structure in which a plurality of conductive particles 203 are coupled together in a direction substantially parallel to the thickness direction defined for the sensitive membrane 20. The mean particle size of the conductive particles 203 is more preferably equal to or greater than 10 nm and equal to or less than 50 nm. Note that as used herein, the "mean particle size" of the conductive particles refers to a number-average size of particle sizes measured by electron microscopy. Specifically, a sample is prepared by either subjecting the sensitive membrane 20 to machining to expose a cross section of the membrane or dispersing a part of the sensitive membrane 20 in an organic solvent and then fixing that part to a supporting member (such as a supporting film). Subsequently, a photograph of the sample is shot with a transmission electron microscope, for example, to calculate the particle size based on the diameter on the photograph and the zoom power of the photograph. The number of particles when the particle size is calculated as an arithmetic mean is preferably equal to or greater than 100 and may be, for example, 1500.

The conductive particles 203 preferably contain a carbon black. This allows the electrical conductivity in the direction perpendicular to the thickness direction defined for the sensitive membrane 20 to be maintained at a sufficiently high value with the sensitive membrane 20 allowed to have a structure in which the conductive particles 203 are coupled together in the direction substantially parallel to the thickness direction defined for the sensitive membrane 20. The carbon black is an aggregate of ultrafine spherical particles formed through incomplete combustion of either hydrocarbon or a compound including carbon.

Optionally, the conductive material 202 may contain an electrically conductive component other than the carbon black. The electrically conductive component may be at least one material selected from the group consisting of, for example, conductive polymers, metals, metal oxides, semiconductors, superconductors, and complex compounds.

The sensitive membrane 20 may contain components other than the above-described ones. For example, it is preferable that the sensitive membrane 20 further contain a dispersant. The dispersant has the function of improving dispersibility when the sensitive material 201 and the conductive particles 203 are prepared to form the sensitive membrane 20. This makes it easier for the sensitive membrane 20 to have a structure in which the conductive particles 203 are coupled together in the direction substantially parallel to the thickness direction, thus enabling further increasing the response speed of the sensitive membrane 20.

The dispersant may be any suitable material as long as the use of the dispersant causes departure from the scope of the present disclosure. The dispersant may include, for example, compounds such as low-molecular-weight dispersants, high-molecular-weight dispersants, binder resins, and synergists.

In the sensitive membrane 20, the proportion of the dispersant to the entire weight of the conductive particles 203 is preferably equal to or greater than 3% by weight and equal to or less than 53% by weight. This makes it easier for the sensitive membrane 20 to have such a structure in which the conductive particles 203 are coupled together in the direction substantially parallel to the thickness direction.

The sensitive membrane 20 may be formed, for example, in the following manner. A mixture is prepared by adding the components which may be included in the sensitive membrane 20 described above, the sensitive material 201, the conductive materials 202 (including the conductive particles 203), and, if necessary, appropriate additives to the solvent. Then, the mixture is stirred up and homogenized. The concentrations of the respective components in the mixture may be adjusted as appropriate. In this embodiment, the concentration of the sensitive material 201 to the solvent is preferably adjusted to a value equal to or greater than 2.5 mg/ml and equal to or less than 40 mg/ml, for example. The concentration of the conductive particles 203 to the solvent is preferably adjusted to a value equal to or greater than 10 mg/ml and equal to or less than 80 mg/ml, for example. Optionally, when mixed, the constituent components may be mixed to be sufficiently homogenized using a mixer or a blender, for example, subsequently kneaded and heated with a kneading machine such as a hot roll or kneader, and then cooled. To stir up the mixture, for example, a disper, a planetary mixer, a ball mill, a three-roll mill, a bead mill, and any other stirrer may be used as appropriate in combination if necessary. A sensitive membrane 20 may be formed by applying the mixture to a suitable base member, for example, to form a coating film and then drying, or heating and drying as needed, the coating film. The mixture may be applied by any appropriate method, which may be, for example, a doctor blade method or an inkjet method. The base member to which the mixture is applied is preferably heated in advance. The temperature of the base member is preferably equal to or higher than 30° C. and equal to or lower than 50° C. When the coating film is heated and dried, the heating temperature and heating duration may be adjusted as appropriate according to the type of the sensitive material 201, the type of the conductive particles 203, and the type of the solvent. It is preferable that the heating temperature be equal to or higher than 50° C. and equal to or lower than 80° C. and that the heating duration be equal to or longer than 0.1 hours and equal to or shorter than 1 hour.

A sensitive membrane 20 may also be formed by applying the mixture onto the substrate 120 and the pair of electrodes 21 and then drying the mixture thus applied. It is preferable that the sensitive membrane 20 have a thickness equal to or greater than 0.1 μm and equal to or less than 10 μm.

In this embodiment, the structure, arrangement, and other properties of the conductive materials 202 may be controlled by controlling the temperature of the base member to 35° C., among other things, as described above. This allows the sensitive membrane 20 to be formed. Note that the thickness of the sensitive membrane 20 and the internal structure of the sensitive membrane 20 (i.e., each of the conductive materials 202 has a structure in which the plurality of conductive particles 203 are coupled together in the direction substantially parallel to the thickness direction defined for the sensitive membrane 20) may be checked based on an image shot through the TEM.

A gas sensor 1 may be formed by subjecting the sensitive membrane 20 subsequently to heating treatment at 85° C., for example. Note that this temperature of the heating treatment is only an example and should not be construed as limiting.

The sensitive membrane 20 according to this embodiment includes the conductive materials 202 having such a structure in which the plurality of conductive particles 203 are coupled together in the direction substantially parallel to the thickness direction defined for the sensitive membrane 20 as described above. Thus, the sensitive membrane 20 according to this embodiment may have a high response speed even if the conductive particles 203 have a high concentration in the sensitive membrane 20. In the sensitive membrane 20, the content per unit volume of the conductive particles 203 with respect to the entire sensitive membrane 20 is preferably equal to or greater than 1.6 g/cm$^3$ and equal to or less than 3.2 g/cm$^3$. This may further increase the response speed of the sensitive membrane 20. The content per unit volume of the conductive particles 203 with respect to the entire sensitive membrane 20 is more preferably equal to or greater than 1.6 g/cm$^3$ and equal to or less than 2.4 g/cm$^3$ and even more preferably equal to or greater than 1.6 g/cm$^3$ and equal to or less than 1.8 g/cm$^3$.

The sensitive membrane 20 preferably has a degree of glossiness equal to or greater than 100. Setting the degree of glossiness at a value equal to or greater than 100 allows the plurality of conductive materials 202 in the sensitive membrane 20 to have a large number of such structures in each of which the plurality of conductive particles 203 are coupled together in the direction substantially parallel to the thickness direction defined for the sensitive membrane 20. This reduces the chances of scattering light compared to a situation where the conductive particles 203 are dispersed at random in the sensitive membrane 20. Consequently, this may further increase the response speed of the sensitive membrane 20. The degree of glossiness of the sensitive membrane 20 may be calculated based on the result of measurement made on the surface of the sensitive membrane 20 under the condition including an angle of incidence of 60 degrees and a receiving light angle of 60 degrees in compliance with the JIS Z8741 standard. The degree of glossiness may be measured with a measuring device such as Gloss Checker (product name: IG-410) manufactured by Horiba, Ltd. The sensitive membrane 20 more preferably has a degree of glossiness equal to or greater than 150 and even more preferably has a degree of glossiness equal to or greater than 170. The upper limit of the degree of glossiness may be, without limitation, equal to or less than 500, for example.

The sensitive membrane 20 preferably has an absolute reflectance equal to or higher than 1% at any wavelength falling within the wavelength range from 500 nm to 800 nm. Setting the absolute reflectance at a value equal to or higher than 1% allows the plurality of conductive materials 202 in the sensitive membrane 20 to have a large number of such structures in each of which the plurality of conductive particles 203 are coupled together in the direction substantially parallel to the thickness direction defined for the sensitive membrane 20. This reduces the chances of scattering light compared to a situation where the conductive particles 203 are dispersed at random in the sensitive membrane 20. Consequently, this may increase the response speed of the sensitive membrane 20 particularly significantly. The absolute reflectance of the sensitive membrane 20 may be calculated by ultraviolet-visible reflection spectroscopy based on the quantity of the light reflected from the sensitive membrane 20 when the sensitive membrane 20 is irradiated with light with a wavelength falling within the wavelength range from 400 nm to 800 nm and the quantity of the light used. A specific measuring method will be described in detail for Examples to be posted later. The sensitive membrane 20 more preferably has, at any wavelength falling within the wavelength range from 500 nm to 800 nm, an absolute reflectance equal to or higher than 5% and even more preferably has an absolute reflectance equal to or higher than 10%. The upper limit of the absolute reflectance of the sensitive membrane 20 may be, without limitation, equal to or less than 50%, for example.

EXAMPLES

Next, specific examples of the present disclosure will be presented. Note that the specific examples to be described below are only examples of the present disclosure and should not be construed as limiting.

1. Preparing Sensitive Membrane Materials and Making Test Piece

Examples 1-3 and Comparative Examples 1 and 2

Conductive particles (a carbon black powder (product name #2300, manufactured by Mitsubishi Chemical Corporation, having a mean particle size of 15 nm, and a specific surface area of 320 m$^2$/g)) were provided as the conductive material, and Sensitive Material #1 (product name OV-275 (dicyano allyl silicone) manufactured by Shinwa Chemical Industries Ltd.) was provided as the sensitive material. The conductive particles and Sensitive Material #1 were added to 40 ml of solvent (NMP: N-methyl-2-pyrrolidone) to have the concentrations shown in Table 1 (to be posted later). In Examples 1 and 2, a synergist (product name E1-N6S, manufactured by Disper Material R & D Corp.) was further added as a dispersant to the solvent to have the concentration shown in Table 1. These components were stirred up and mixed using a ball mill under the condition including room temperature (of about 25° C.), an ordinary pressure, and the air. The durations for mixing and stirring (dispersion times) in these Examples and Comparative Examples are as shown in Table 1. In this manner, a material for forming a sensitive membrane (hereinafter referred to as a "sensitive membrane material") was prepared.

Next, an electrode chip including a base member and a pair of electrodes on the base member was provided, and the sensitive membrane material was applied onto the electrode chip to cover the base member and the electrodes. In this manner, a coating film of the sensitive membrane material was formed. In Example 3, four different coating films with mutually different thicknesses were formed by changing the amount of the sensitive membrane material. The temperature of the base member at the time of application was set at 35° C. This coating film was dried for 0.5 hours at 50° C. In this manner, a sensitive membrane was formed on the base member. The sensitive membrane thus formed was observed through a TEM to check the condition of the conductive particles (conductive material) in the sensitive membrane based on the image thus shot (refer to FIGS. 4A and 4B).

Next, the coating film that had been dried was heated to 85° C. for 12 hours, thereby forming a test piece of a gas sensor including a sensitive membrane on the base member and electrodes. The conductive particles in the sensitive membrane were electrically connected to the pair of electrodes of the gas sensor. Furthermore, in the gas sensor, a detector for measuring the resistance value was electrically connected to the pair of electrodes.

Examples 4-7

Conductive particles (a carbon black powder (product name #2300, manufactured by Mitsubishi Chemical Corporation, having a mean particle size of 15 nm and a specific surface area of 320 $m^2/g$)) were provided as the conductive material, and Sensitive Material #2 (product name OV-330 (polysiloxane-polyethylene glycol copolymer) manufactured by Shinwa Chemical Industries Ltd.) was provided as the sensitive material. The conductive particles and Sensitive Material #2 were added to 40 ml of solvent (hexyl acetate) to have the concentrations shown in Table 2 (to be posted later). In Examples 4, 6, and 7, a synergist (product name E1-N6S, manufactured by Disper Material R & D Corp.) was further added as a dispersant to the solvent to have the concentration shown in Table 2. These components were stirred up and mixed using a ball mill under the condition including room temperature (of about 25° C.), an ordinary pressure, and the air. The durations for mixing and stirring (dispersion times) in these Examples are as shown in Table 2. In this manner, a material for forming a sensitive membrane (hereinafter referred to as a "sensitive membrane material") was prepared.

Next, an electrode chip including a base member and a pair of electrodes on the base member was provided, and the sensitive membrane material was applied onto the electrode chip to cover the base member and the electrodes. In this manner, a coating film of the sensitive membrane material was formed. In Example 7, three different coating films with mutually different film thicknesses were formed by changing the amount of the sensitive membrane material. The temperature of the base member at the time of application was set at 35° C. This coating film was dried for 0.5 hours at 50° C. In this manner, a sensitive membrane was formed on the base member. The carbon black included in the sensitive membrane had a density of 0.53 $g/cm^3$ in Example 4, 0.64 $g/cm^3$ in Example 5, 1.6 $g/cm^3$ in Example 6, and 1.78 $g/cm^3$ in Example 7.

Next, the coating film that had been dried was heated to 85° C. for 12 hours, thereby forming a test piece of a gas sensor including a sensitive membrane over the base member and electrodes. The conductive particles in the sensitive membrane were electrically connected to the pair of electrodes of the gas sensor. Furthermore, in the gas sensor, a detector for measuring the resistance value was electrically connected to the pair of electrodes.

Figure 5B:
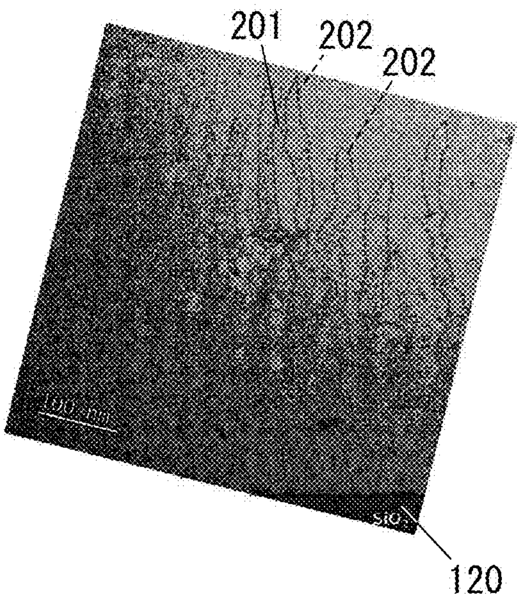
FIG. 5B shows, on a smaller scale, the TEM image shown in FIG. 4A as a reference indicating a condition of the conductive material.
Figure 5C:
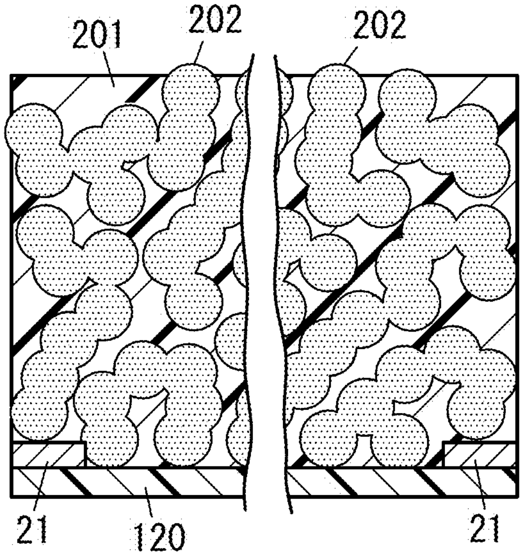
FIG. 5C is a schematic cross-sectional view generally illustrating a condition of a conductive material included in a sensitive membrane according to Comparative Example 1.
Figure 5D:
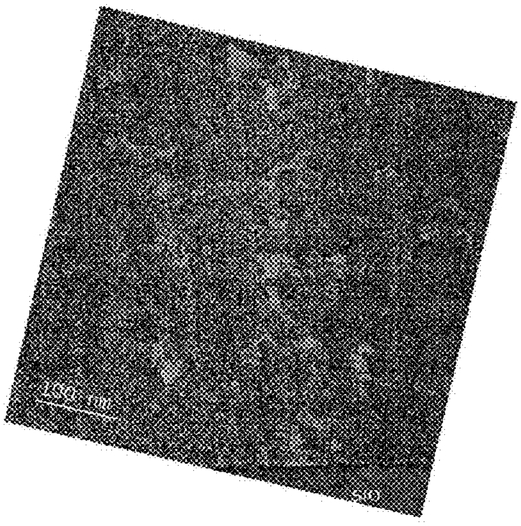
FIG. 5D shows, on a smaller scale, the TEM image shown in FIG. 4B as a reference indicating a condition of the conductive material.

2. Evaluations 2.1 Observation of Internal Structure of Sensitive Membrane Through TEM In each of Examples and Comparative Examples, the sensitive membrane was observed through a TEM to check, based on images thus shot, the condition of the conductive particles (conductive material) in the sensitive membrane. FIG. 4A shows a TEM image of Example 1, and FIG. 4B shows a TEM image of Comparative Example 1. As shown in FIG. 4B, the conductive particles are dispersed at random in Comparative Example 1. On the other hand, in Example 1, the conductive materials, each being made up of a plurality of conductive particles, are arranged one on top of another in the thickness direction defined for the membrane as shown in FIG. 4A. In addition, boundaries, each of which is continuous in the thickness direction defined for the sensitive membrane, are observed between the plurality of conductive materials as indicated for reference by the dotted line in FIG. 5B. FIGS. 5A and 5C are schematic cross-sectional views schematically illustrating the appearance of the conductive materials, the conductive particles, and the sensitive material in the sensitive membrane based on the TEM images shown in FIGS. 4A and 4B, respectively. FIG. 5D shows the TEM image of FIG. 4B on a smaller scale.

In Comparative Example 2, the random dispersion of the conductive materials (conductive particles) was also observed as in Comparative Example 1. On the other hand, in Examples 2-7, it was confirmed that the conductive materials each had a structure in which a plurality of conductive particles were coupled together and arranged one on top of another in the thickness direction defined for the sensitive membrane as in Example 1.

2.2 Response Speed

Figure 6A:
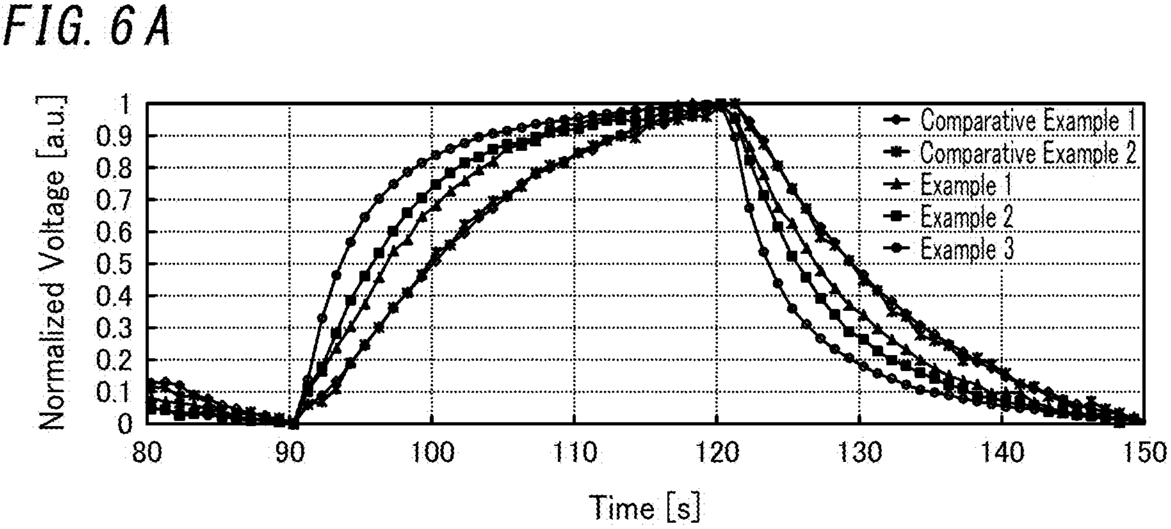
FIG. 6A is a graph showing a relationship between the time and the voltage value in Comparative Examples 1 and 2 and Examples 1-3.
Figure 6B:
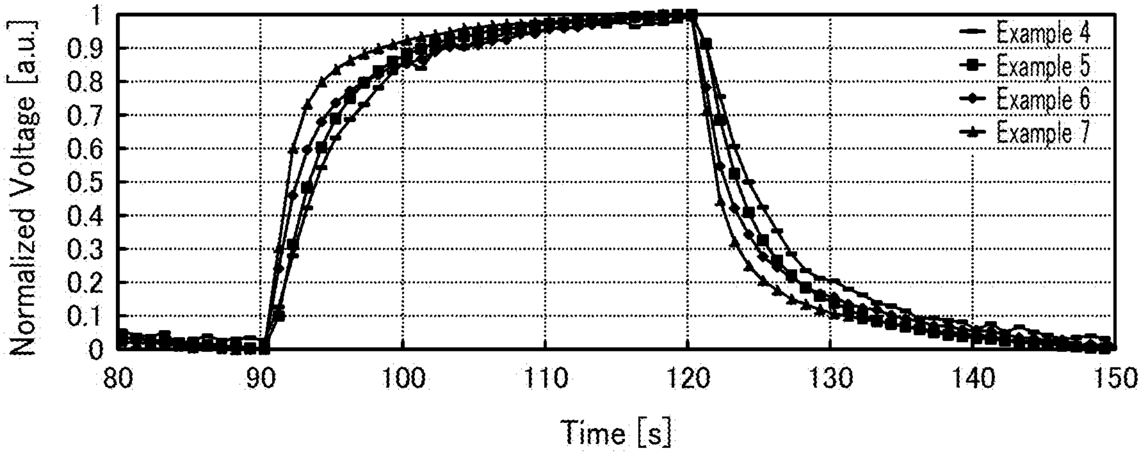
FIG. 6B is a graph showing a relationship between the time and the voltage value in Examples 4-7.

The response speed was measured for each of the gas sensors representing Examples and Comparative Examples. Specifically, in one cycle, nitrogen gas and benzaldehyde were alternately supplied into the gas sensor such that nitrogen gas was supplied for 30 seconds as an odorless gas into the gas sensor and then benzaldehyde with a concentration of 10 ppm was supplied for 30 seconds as an evaluation gas into the gas sensor. This cycle was repeated six times, thereby measuring a variation in voltage value as the resistance value varied with time (in seconds). In this case, with a point in time when the odorless gas started to be supplied regarded as 0 seconds (starting point), the above-described cycle was repeated until 360 seconds passed. FIGS. 6A and 6B each show the response waveforms of gas sensors in a period from a point in time when 80 seconds passed since the starting point through a point in time when 150 seconds passed since the starting point. In FIGS. 6A and 6B, the ordinate indicates the voltage value, and the abscissa indicates the time. FIG. 6A shows the results obtained in Comparative Examples 1 and 2 and Examples 1-3. FIG. 6B shows the results obtained in Examples 4-7. As used herein, the "voltage value" refers to a voltage value normalized, based on the gas sensor's response waveform from the point in time when 80 seconds passed since the starting point and through the point in time when 150 seconds passed since the starting point, with the minimum voltage value (corresponding to a voltage value when 90 seconds passed since then) supposed to be zero and with the maximum voltage value (corresponding to a voltage value when 120 seconds passed since then) supposed to be one. Also, the response times were calculated based on these results for respective Comparative Examples and Examples. The response time was calculated based on the results shown in FIGS. 6A and 6B with the maximum voltage value while the evaluation gas was being supplied (corresponding to a voltage value when 120 seconds passed) regarded as defining an equilibrium state and with the time it took for the voltage value to reach 63.2% of the voltage value in the equilibrium state since the point in time when the evaluation gas started to be supplied (when 90 seconds passed) defined to be a time constant. The numerical values of the response time are shown in Tables 1 and 2.

2.3 Degree of Glossiness

The degrees of glossiness were measured for the sensitive membranes representing respective Examples and Comparative Examples. The degree of glossiness of the sensitive membrane was calculated based on the result of measurement made on the surface of the sensitive membrane under the condition including an angle of incidence of 60 degrees and a receiving light angle of 60 degrees in compliance with the JIS Z8741 standard. The degree of glossiness was measured with Gloss Checker (product name: IG-410) manufactured by Horiba, Ltd. The results are shown in Tables 1 and 2.

Figure 7:
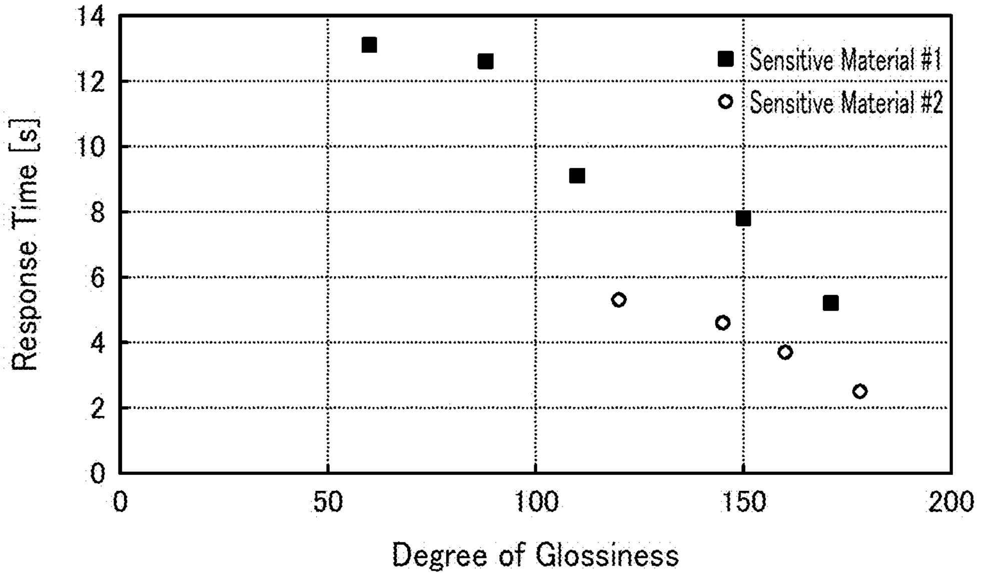
FIG. 7 is a graph showing a relationship between the degree of glossiness and the response time in Comparative Examples 1 and 2 and Examples 1-7.

FIG. 7 is a graph showing, based on these results, a relationship between the degree of glossiness and the response time. As can be seen from FIG. 7, irrespective of the type of the sensitive material, the higher the degree of glossiness is, the shorter the response time is (i.e., the higher the response speed can be).

2.4 Reflectance (Measurement of Ultraviolet-Visible Reflection Spectra)

Figure 8:
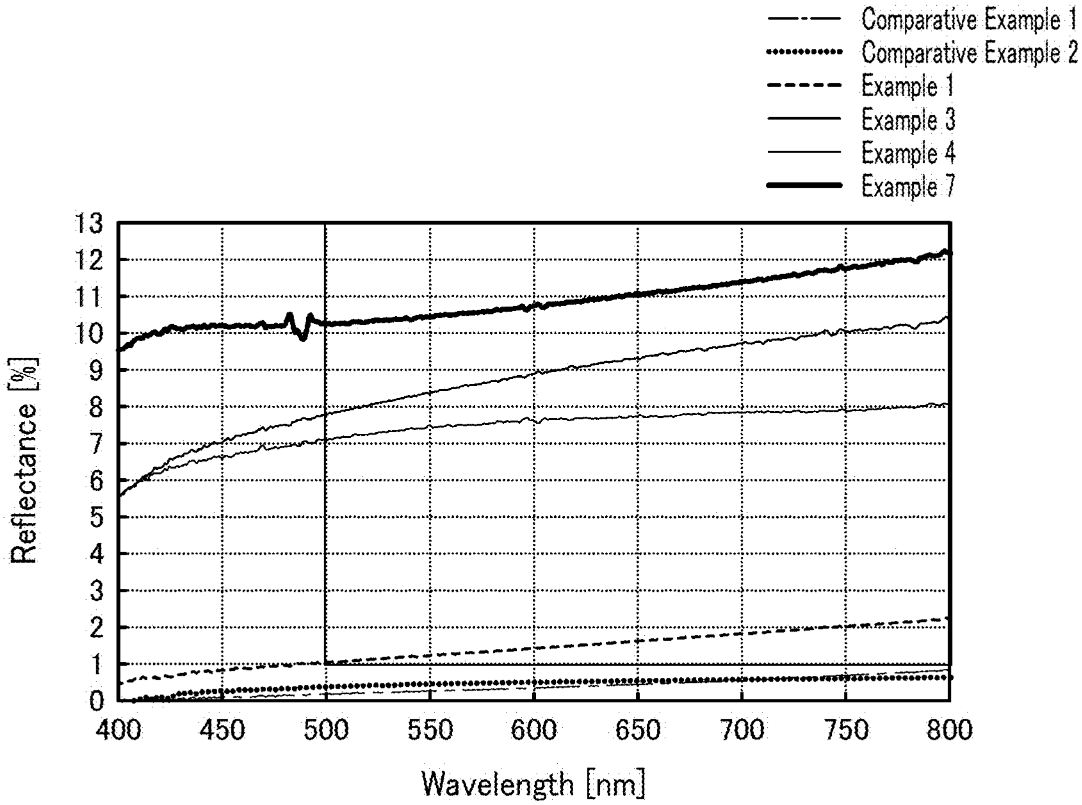
FIG. 8 is a graph showing, based on the result of measurement of ultraviolet-visible reflectance spectra in Comparative Examples 1 and 2 and Examples 1, 3, 4, and 7, a relationship between the wavelength and the reflectance.

The ultraviolet-visible reflection spectra of the sensitive membranes representing Examples 1, 3, 4, and 7 and Comparative Examples 1 and 2 were measured to evaluate the reflectance values of the respective sensitive membranes. Specifically, using a microscopic reflection spectroscopic film thickness meter (model number FE-3000 manufactured by Otsuka Electronics Co., Ltd.), the reflection spectra were measured by irradiating a measurement spot with a size of 40 μmΦ on the sensitive membrane with light having a wavelength falling within the range from 400 nm to 800 nm under the condition including a measurement duration of 100 ms and a cumulative number of times of 50 times. The results thus obtained are shown in FIG. 8. FIG. 8 is a graph, of which the ordinate indicates the absolute reflectance, and the abscissa indicates the wavelength.

As a result, in Comparative Examples 1 and 2, only a reflectance less than 1% was achieved at any wavelength falling within the range from 400 nm to 800 nm. In Examples 1, 3, 4, and 7 on the other hand, a reflectance equal to or higher than 1% was achieved. The reflectance turned out to be particularly high within the wavelength range from 500 nm to 800 nm. In addition, in Examples 3, 4, and 7, a reflectance as high as 5% or more was achieved at any wavelength falling within the range from 400 nm to 500 nm.

Figure 9A:
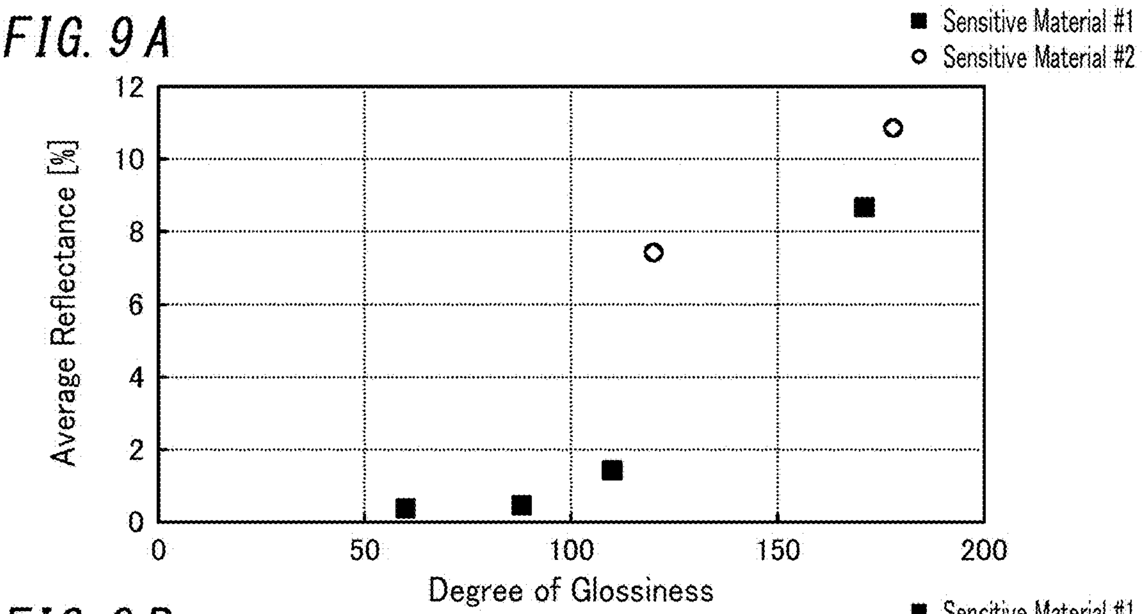
FIG. 9A is a graph showing a relationship between the degree of glossiness and the average reflectance in Comparative Examples 1 and 2 and Examples 1, 3, 4, and 7.
Figure 9B:
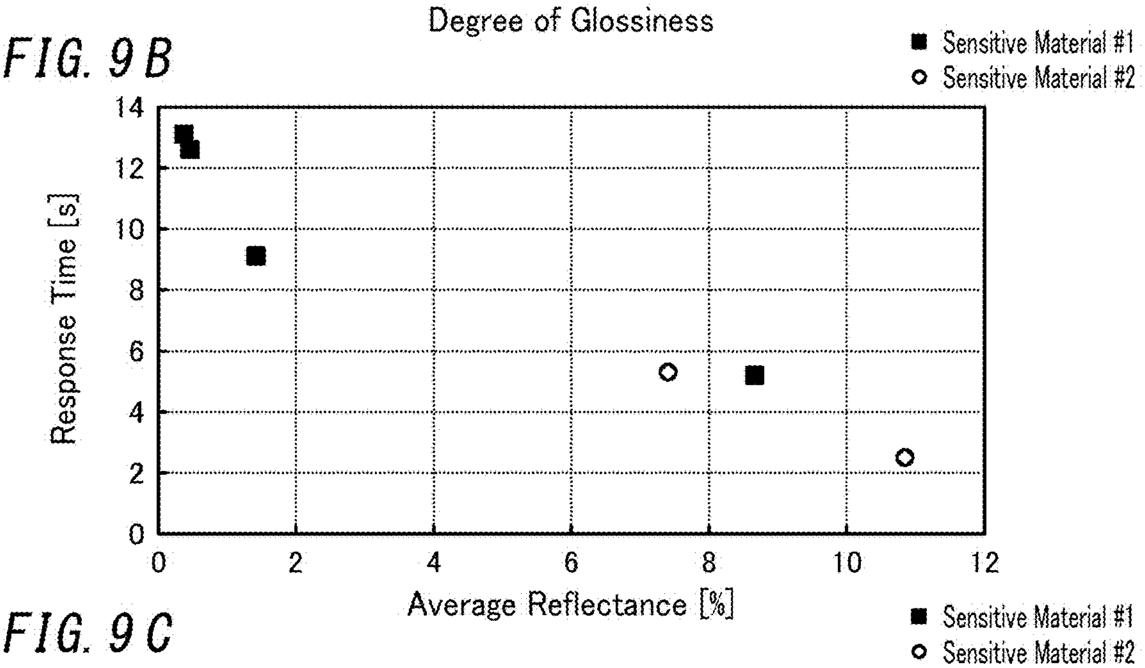
FIG. 9B is a graph showing a relationship between the average reflectance and the response time in Comparative Examples 1 and 2 and Examples 1, 3, 4, and 7.

An average reflectance within the range from 400 nm to 800 nm was calculated based on the absolute reflectance obtained as described above. FIG. 9A is a graph showing a relationship between the degree of glossiness and the average reflectance based on the evaluation results described in the sections 2.1 and 2.2. FIG. 9B is a graph showing a relationship between the average reflectance and the response time.

As can be seen from FIG. 9A, the higher the degree of glossiness is, the higher the average reflectance is. The same tendency is observed irrespective of the type of the sensitive material. Furthermore, as shown in FIG. 9B, the higher the average reflectance was, the shorter the response time turned out to be. The same tendency was observed irrespective of the type of the sensitive material. The same tendency would be observed in Examples 2, 5, and 6, as well.

Figure 9C:
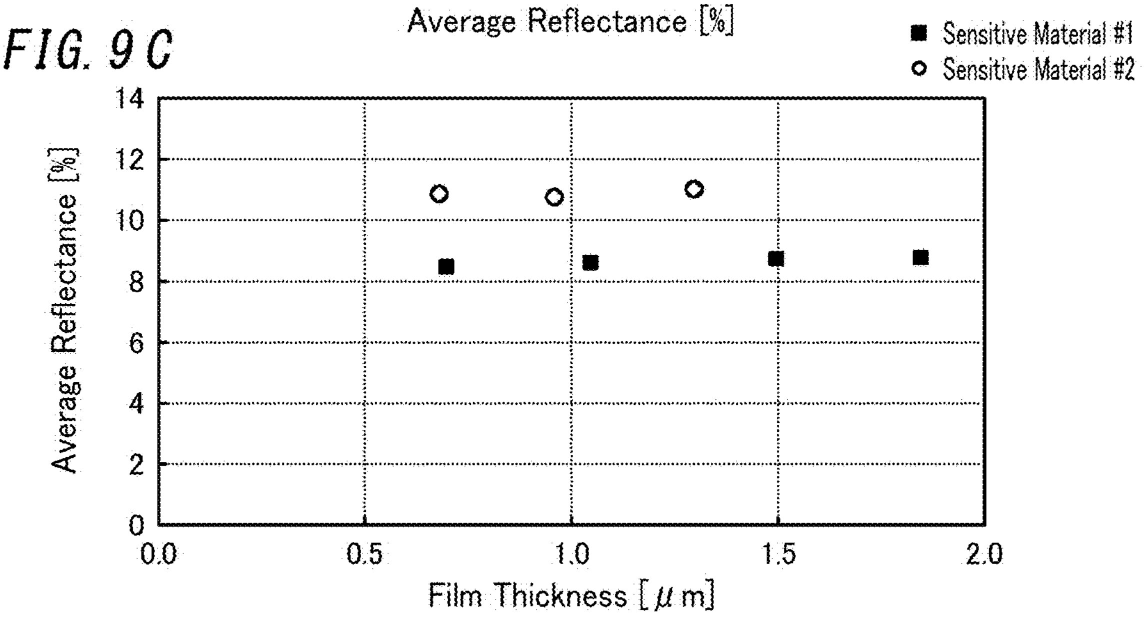
FIG. 9C is a graph showing a relationship between the film thickness and the average reflectance in Examples 3 and 7.

In addition, as for multiple different coating films (four different types for Example 3 and three different types for Example 7), of which the film thicknesses were set at multiple different values for Examples 3 and 7 based on the average reflectance values calculated as described above, the relationship between the average reflectance and the film thickness within the range from 400 nm to 800 nm was checked when the sensitive membrane was made of Sensitive Material #1 and when the sensitive membrane was made of Sensitive Material #2. As a result, the present inventors discovered that no matter whether the sensitive membrane was made of Sensitive Material #1 or Sensitive Material #2, the effect of the film thickness on the average reflectance within the range from 400 nm to 800 nm was so little that the average reflectance hardly changed as shown in FIG. 9C irrespective of the type of the sensitive material and even when the film thickness was changed. The reflectance would be calculated by subtracting the attenuation rate when the light passes through the sensitive membrane from the sum of the reflectance at the surface of the sensitive membrane and the reflectance at the interface between the sensitive membrane and the substrate. In the sensitive membrane according to the present disclosure, the attenuation rate when the light passes through the sensitive membrane would have little dependence on the film thickness.

TABLE 1

| | Cmp. Ex. 1 | Cmp. Ex. 2 | Ex. 1 | Ex. 2 | Ex. 3 |
|---|---|---|---|---|---|
| Concentration of conductive material | 20 mg/ml | 20 mg/ml | 30 mg/ml | 20 mg/ml | 30 mg/ml |
| Concentration of Sensitive Material #1 | 10 mg/ml | 10 mg/ml | 10 mg/ml | 10 mg/ml | 10 mg/ml |
| Solvent | NMP | NMP | NMP | NMP | NMP |
| Amount (concentration) of synergist added | — | — | 0.9 mg/ml | 0.6 mg/ml | — |
| Dispersion time | 8 hrs. | 10 hrs. | 10 hrs. | 10 hrs. | 12 hrs. |
| Degree of glossiness | 60 | 88 | 110 | 150 | 171 |
| Response time [s] | 13.1 | 12.6 | 9.1 | 7.8 | 5.2 |

TABLE 2

| | Ex. 4 | Ex. 5 | Ex. 6 | Ex. 7 |
|---|---|---|---|---|
| Concentration of conductive material | 40 mg/ml | 16 mg/ml | 40 mg/ml | 40 mg/ml |
| Concentration of Sensitive Material #2 | 10 mg/ml | 12 mg/ml | 10 mg/ml | 8 mg/ml |
| Solvent | Hexyl acetate | Hexyl acetate | Hexyl acetate | Hexyl acetate |
| Amount (concentration) of synergist added | 1.2 mg/ml | — | 1.2 mg/ml | 1.2 mg/ml |
| Dispersion time | 4.5 hrs. | 10 hrs. | 10 hrs. | 10 hrs. |
| Degree of glossiness | 120 | 145 | 160 | 178 |
| Response time [s] | 5.3 | 4.6 | 3.7 | 2.5 |

(Recapitulation)

As can be seen from the foregoing description, a sensitive membrane (20) according to a first aspect contains a sensitive material (201) that adsorbs an analyte and a plurality of conductive materials (202). Each of the plurality of conductive materials (202) has a structure in which a plurality of conductive particles (203) are coupled together in a direction substantially parallel to a thickness direction defined for the sensitive membrane (20).

This aspect achieves the advantage of increasing the response speed of the sensor.

In a sensitive membrane (20) according to a second aspect, which may be implemented in conjunction with the first aspect, the plurality of conductive materials (202) are dispersed in the sensitive membrane (20) to be spaced from each other in a direction perpendicular to the thickness direction defined for the sensitive membrane (20). The sensitive material (201) is interposed between adjacent conductive materials (202) belonging to the plurality of conductive materials (202).

This aspect achieves the advantage of increasing the response speed of the sensor significantly.

A sensitive membrane (20) according to a third aspect, which may be implemented in conjunction with the first or second aspect, has a degree of glossiness equal to or greater than 100 as measured in compliance with the JIS Z8741 standard.

This aspect achieves the advantage of increasing the response speed of the sensor more significantly.

A sensitive membrane (20) according to a fourth aspect, which may be implemented in conjunction with any one of the first to third aspects, has an absolute reflectance equal to or higher than 1% at any wavelength falling within a wavelength range from 500 nm to 800 nm.

This aspect achieves the advantage of increasing the response speed of the sensor even more significantly.

In a sensitive membrane (20) according to a fifth aspect, which may be implemented in conjunction with any one of the first to fourth aspects, the conductive particles (203) contain a carbon black.

This aspect achieves the advantage of contributing to further increasing the response speed of the sensor.

In a sensitive membrane (20) according to a sixth aspect, which may be implemented in conjunction with any one of the first to fifth aspects, content per unit volume of the conductive particles (203) with respect to the entire sensitive membrane (20) is equal to or greater than 1.6 g/cm$^3$.

This aspect achieves the advantage of contributing to increasing the response speed of the sensor more significantly.

In a sensitive membrane (20) according to a seventh aspect, which may be implemented in conjunction with any one of the first to sixth aspects, the sensitive material (201) has either or both of a polysiloxane structure and/or a polyethylene glycol structure.

This aspect achieves the advantage of allowing the sensitive material (201) of the sensitive membrane (20) to adsorb the analyte more easily.

In a sensitive membrane (20) according to an eighth aspect, which may be implemented in conjunction with any one of the first to seventh aspects, the sensitive material (201) is expandable upon adsorbing the analyte.

This aspect achieves the advantage of contributing to increasing the response speed of the sensor even more significantly.

A gas sensor (1) according to a ninth aspect includes: a substrate (120); a pair of electrodes (21) arranged on the substrate (120); and the sensitive membrane (20) according to any one of the first to eighth aspects. The sensitive membrane (20) is electrically connected to the pair of electrodes (21). Each of the plurality of conductive materials (202) of the sensitive membrane (20) has a structure in which a plurality of conductive particles (203) are coupled together in a direction perpendicular to a direction in which the pair of electrodes (21) are arranged side by side.

This aspect achieves the advantage of providing a gas sensor (1) with a high response speed.

REFERENCE SIGNS LIST

1 Gas Sensor
20 Sensitive Membrane
21 Electrode
201 Sensitive Material
202 Conductive Material
203 Conductive Particle

The invention claimed is:

1. A sensitive membrane containing a sensitive material that adsorbs an analyte and a plurality of conductive materials, each of the plurality of conductive materials having a structure in which a plurality of conductive particles are coupled together in a direction substantially parallel to a thickness direction defined for the sensitive membrane.

2. The sensitive membrane of claim 1, wherein the plurality of conductive materials are dispersed in the sensitive membrane to be spaced from each other in a direction perpendicular to the thickness direction defined for the sensitive membrane, and the sensitive material is interposed between adjacent conductive materials belonging to the plurality of conductive materials.

3. The sensitive membrane of claim 1, wherein the sensitive membrane has a degree of glossiness equal to or greater than 100 as measured in compliance with the JIS Z8741 standard.

4. The sensitive membrane of claim 1, wherein
the sensitive membrane has an absolute reflectance equal to or higher than 1% at any wavelength falling within a wavelength range from 500 nm to 800 nm.

5. The sensitive membrane of claim 1, wherein
the conductive particles contain a carbon black.

6. The sensitive membrane of claim 1, wherein
content per unit volume of the conductive particles with respect to the sensitive membrane is equal to or greater than 1.6 $g/cm^3$.

7. The sensitive membrane of claim 1, wherein
the sensitive material has either or both of a polysiloxane structure and/or a polyethylene glycol structure.

8. The sensitive membrane of claim 1, wherein
the sensitive material is expandable upon adsorbing the analyte.

9. A gas sensor comprising: a substrate; a pair of electrodes arranged on the substrate; and the sensitive membrane of claim 1,
the sensitive membrane being electrically connected to the pair of electrodes, and
each of the plurality of conductive materials of the sensitive membrane having a structure in which the plurality of conductive particles are coupled together in a direction perpendicular to a direction in which the pair of electrodes are arranged side by side.

* * * * *